United States Patent
Richard et al.

(10) Patent No.: US 10,855,607 B2
(45) Date of Patent: Dec. 1, 2020

(54) TERMINAL AND METHOD FOR TRANSMITTING DATA VIA A STRAINED CHANNEL

(71) Applicant: AVANTIX, Aix-en-Provence (FR)

(72) Inventors: Julien Richard, Marseilles (FR); Alexandre Roman, Hyères (FR)

(*) Notice: Subject to any disclaimer, the term of this patent is extended or adjusted under 35 U.S.C. 154(b) by 0 days.

(21) Appl. No.: 16/062,307

(22) PCT Filed: Dec. 19, 2016

(86) PCT No.: PCT/EP2016/081758
§ 371 (c)(1),
(2) Date: Jun. 14, 2018

(87) PCT Pub. No.: WO2017/103271
PCT Pub. Date: Jun. 22, 2017

(65) Prior Publication Data
US 2018/0375779 A1  Dec. 27, 2018

(30) Foreign Application Priority Data

Dec. 18, 2015  (FR) ...................................... 15 02631

(51) Int. Cl.
| | | |
|---|---|---|
| *H04L 12/805* | (2013.01) | |
| *H04L 12/801* | (2013.01) | |
| *H04L 12/825* | (2013.01) | |
| *H04L 12/851* | (2013.01) | |
| *H04W 28/12* | (2009.01) | |
| *H04W 28/10* | (2009.01) | |
| *H04W 40/22* | (2009.01) | |

(52) U.S. Cl.
CPC .............. *H04L 47/26* (2013.01); *H04L 47/24* (2013.01); *H04L 47/36* (2013.01); *H04L 47/39* (2013.01); *H04W 28/10* (2013.01); *H04W 28/12* (2013.01); *H04W 40/22* (2013.01)

(58) Field of Classification Search
CPC ......... H04L 47/39; H04L 47/26; H04L 47/24; H04L 47/36; H04W 28/10; H04W 28/12; H04W 28/22
See application file for complete search history.

(56) References Cited

U.S. PATENT DOCUMENTS

| | | | |
|---|---|---|---|
| 7,065,575 B1 | 6/2006 | Machiraju et al. | |
| 2014/0328172 A1* | 11/2014 | Kumar | H04L 47/18 370/231 |

FOREIGN PATENT DOCUMENTS

| | | |
|---|---|---|
| WO | WO 00/41365 A1 | 7/2000 |
| WO | WO 01/63856 A1 | 8/2001 |
| WO | WO 2014/022492 A1 | 2/2014 |

OTHER PUBLICATIONS

International Search Report as issued in International Patent Application No. PCT/EP2016/081758, dated Feb. 21, 2017.

* cited by examiner

*Primary Examiner* — Kent Krueger
(74) *Attorney, Agent, or Firm* — Pillsbury Winthrop Shaw Pittman LLP

(57) ABSTRACT

A method for transmitting data by a terminal connected to a data relay device, the data transmitted by the terminal being forwarded by the relay device, includes the following steps implemented by the terminal: receiving an invitation message to transmit data; selecting a set of data to transmit; producing a data message to be transmitted, including the selected data; sending the data message in response to the invitation message.

9 Claims, 2 Drawing Sheets

TERMINAL AND METHOD FOR TRANSMITTING DATA VIA A STRAINED CHANNEL

CROSS-REFERENCE TO RELATED APPLICATIONS

This application is the U.S. National Stage of PCT/EP2016/081758, filed Dec. 19, 2016, which in turn claims priority to French patent application number 15/02631 filed Dec. 18, 2015. The content of these applications are incorporated herein by reference in their entireties.

TECHNICAL FIELD OF THE INVENTION

The invention relates to a terminal and a method for transmitting data via a strained channel. A strained channel is a channel of which the pass-band is limited. In particular, the field of the invention is that of the use of time multiplexed channels, a channel corresponding to at least one time window in said multiplexing.

The field of the invention is that of communication devices, in particular that of communication devices having to maximise an information/pass-band ratio.

In the present text, terminal and in particular communications terminal is taken to mean any communicating data processing device which includes, in a non-limiting manner, so-called smartphones, tablets, desktop and portable computers. The invention is however more particularly intended for transportable terminals such as those that are used in military operation theatres.

PRIOR ART

In the prior art, a terminal used in a military operation theatre is connected to a data relay device, for example a PR4G for fourth generation radio set. When a user of the terminal wishes to transmit a message it uses the terminal to compose said message. Once the message has been composed the user validates it which brings about its sending. The sending of the message consists in submitting it to the relay device. From this moment, for the terminal and its user the message has been "sent".

However, in practice, the message is only submitted to the relay device. The relay device is then charged with forwarding it to its recipient. Still in practice, it may be that the relay device is heavily loaded, that is to say it may be that the relay device has a long queue of messages to process. Such a case may arise, for example, if the user rapidly sends a plurality of messages.

From the point of view of the terminal, and thus of the user, all the messages will be sent. However, a large number of these messages will in fact be stored at the level of the relay device awaiting forwarding.

The user is thus in a situation in which it thinks that its messages have indeed been sent whereas in fact this is not the case. This contention occurs when the actual data transfer rate of the link between the terminal and the relay device is greater than the data transfer rate of the channel allocated by the relay device to the terminal. This happens in situations of stress and/or intense loading during combat. It is thus possible that messages arrive at their destination too late, or even never.

To overcome this problem, a prioritised queue of messages has been put in place at the level of the relay device. In this queue, each message is associated with a priority, the messages of highest priority are sent before the others. Thus, if a priority message arrives even though the queue already comprises several non-priority messages, the priority message will be sent before the others.

This solution resolves certain problems but poses others:
It is possible that a message is never sent if it is of too low priority: it will always be preceded by higher priority messages;
It is possible that there is a return to the initial situation if all the messages have the highest priority. This arises in situations of extreme stress and urgency, for example during combat.

A satisfactory solution to this problem thus does not exist: to enable a user of a terminal connected to a relay device to visualise the actual forwarding of the messages that said user sends.

DESCRIPTION OF THE INVENTION

In the invention the sending of a message is conditioned by prompting from the relay device. That is to say that the terminal only sends a message to the relay device if it has received an invitation to do so.

Following the reception of this invitation, it is the terminal that decides which message, or data set, or among a set of messages, or among a set of data sets, it wishes to transmit. The terminal is then free, within the limit of its programming, to apply the algorithm that it wishes for the selection of a message. But above all, the terminal is capable of enabling the visualisation of the messages that have actually been sent. Indeed the terminal is only prompted when the relay device has pass-band available which guarantees immediate forwarding of the message.

To this end the invention relates to a method for transmitting data by a terminal connected to a data relay device, the data transmitted by the terminal being forwarded by the relay device, characterised in that it comprises the following steps, implemented by the terminal:
Receiving an invitation message to transmit data;
Selecting a set of data to transmit;
Producing a data message to be transmitted comprising the selected data;
Sending the data message in response to the invitation message.

Apart from the main characteristics that have been mentioned in the preceding paragraph, the method/device according to the invention may have one or more additional characteristics among the following, considered individually or according to all technically possible combinations thereof:
An invitation message comprises a capacity information expressing a quantity of data that can be transmitted during a time interval predetermined from a date of receiving an invitation message.
The size of the data contained in the data message may be greater than the capacity information.
A time interval between a first invitation message and a following second invitation message depends on the quantity of selected data.
The selection of data is done from among a set of data sets, the step of selecting data comprising the following steps:
Allocating a score to each data set;
Selecting the data set having the best score.

The invention also relates to a recording support that can be read by a computer on which is recorded a computer programme including programme code instructions for the execution of steps of the method according to a possible combination of the aforementioned characteristics.

The invention also relates to a device implementing the method according to a possible combination of the aforementioned characteristics.

BRIEF DESCRIPTION OF THE FIGURES

Other characteristics and advantages of the invention will become clear from reading the following description, with reference to the appended figures, which illustrate.

For greater clarity, identical or similar elements are marked by identical reference signs in all of the figures.

The invention will be better understood on reading the following description and examining the figures that accompany it. These are presented for indicative purposes and in no way limit the invention.

DETAILED DESCRIPTION OF AN EMBODIMENT

Figure 1:
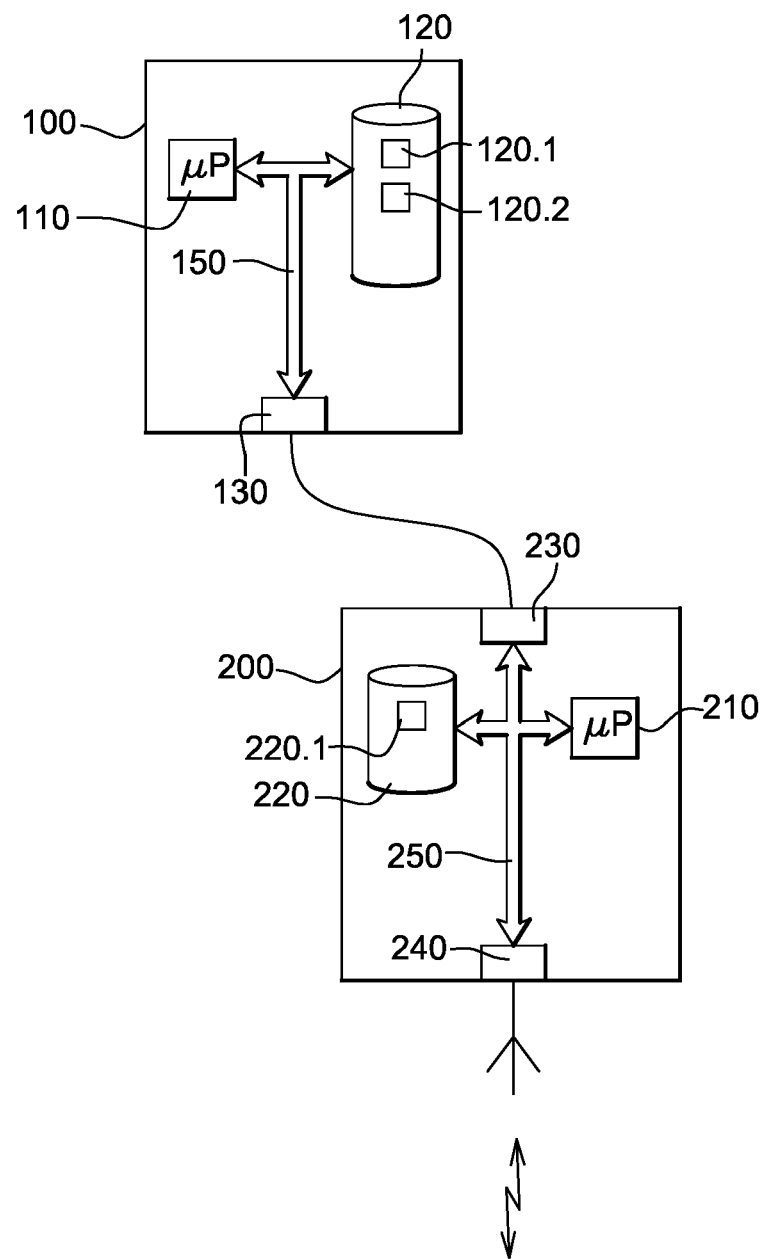
FIG. 1: an illustration of an infrastructure enabling the implementation of the invention.

FIG. 1 shows a terminal 100 intended for the implementation of the invention, that is to say a terminal according to the invention. The terminal comprises:
 a microprocessor 110;
 storage means 120, for example a hard disk, mechanical or not, whether single or in an array (for example RAID);
 a communication interface 130, for example a communication card according to the Ethernet protocol. Other protocols may be envisaged such as IP, USB, Wifi, BlueTooth, etc. The communication interface is thus wired or wireless.

The microprocessor 110 of the terminal, the storage means 120 of the terminal and the communication interface 130 of the terminal are interconnected by a bus 150.

When an action is ascribed to a device, said action is in fact carried out by a microprocessor of the device commanded by instruction codes recorded in a memory of the device. If an action is ascribed to an application, said action is in fact carried out by a microprocessor of the device in a memory of which instruction codes corresponding to the application are recorded. When a device, or an application, transmits a message, said message is transmitted via a communication interface of said device or of said application. In these cases, a device is real or virtual.

A terminal is, for example and in a non-limiting manner:
 a tablet;
 a smartphone;
 a portable computer;
 a desktop computer;
 etc.

FIG. 1 shows a relay device 200. The relay device comprises:
 a microprocessor 210;
 storage means 220;
 a first communication interface 230 compatible with the communication interface 130 of the terminal. The terminal and the relay device are thereby capable of communicating with each other;
 a second communication interface 240 capable of establishing a link with another relay device not represented.

The microprocessor 210 of the relay device, the storage means 220 of the relay device, the first communication interface 230 of the relay device and the second communication interface 240 of the relay device are interconnected by a bus 250.

A relay device is, for example and in a non-limiting manner:
 a radio set;
 a modem device;
 etc.

The storage means 120 of the terminal comprise:
 a message management zone 120.1 comprising instruction codes for the execution of the method according to the invention;
 a data zone 120.2 structured to record data sets. The data zone may thus be seen as a set of data sets. If a data set is likened to a message, the data zone may be seen as a set of messages. In an alternative of the invention the data zone 120.2 makes it possible to associate a message with properties. At a given instant these properties make it possible to calculate a score for the message. These properties are, for example:
 Date of recording of the message;
 Level of priority of the message;
 Duration of validity of the message;
 . . . the list is not exhaustive.

The storage means of the relay device comprise:
 A message management zone 230.1 comprising instruction codes for communicating with a terminal and taking charge of messages transmitted by the terminal.

Figure 2:
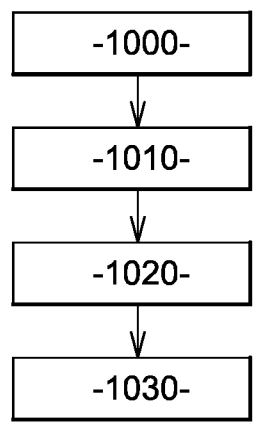
FIG. 2: an illustration of steps of the method according to the invention.
Figure 3:
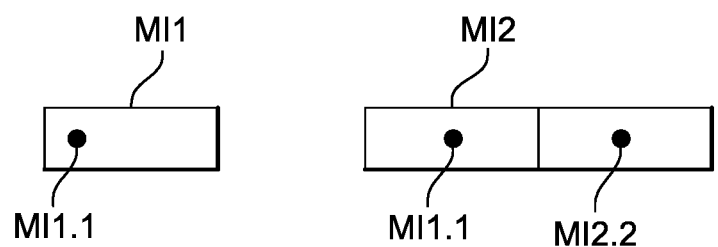
FIG. 3 illustrates a first invitation message and a second invitation message.

FIG. 2 shows a step 1000 in which the terminal receives an invitation message MI1 transmitted by the relay device. In one embodiment such a message uniquely comprises a code MI1.1, the reception of such a message with said code being associated at the level of the terminal with a predetermined behaviour. The predetermined behaviour is the implementation of the invention.

In practice, the relay device transmits invitation messages according to two criteria:
 A time criterion, and
 A quantity of data remaining to be transmitted.

The time criterion depends on the communication channel allocated to the terminal. Such a channel corresponds to a set of time windows in a cycle. In practice, a cycle lasts four seconds and a terminal is associated with a window enabling the transmission of twelve octets. In practice, and with the configuration described, the terminal receives at the most an invitation message every four seconds.

A quantity of data to be transmitted can lengthen this period which remains however a multiple of four seconds, with the configuration described. Indeed if the relay device still has to transmit K octets on behalf of the terminal then the device is going to wait in order to no longer have any octet to transmit on behalf of the terminal before transmitting a new invitation message. This wait corresponds to the whole part of K/12+1, for the envisaged configuration.

It is thereby certain that the terminal only receives an invitation when the relay device can transmit on its behalf.

From the step 1000 of receiving an invitation message the terminal passes to a step 1010 of selecting a data set to be transmitted.

In the step 1010 of selecting a data set, the terminal searches through the data zone 120.2 to select a message set. Several possible strategies exist for selecting a message:

the data zone is organised like a queue, the first data set recorded is then the first data set consumed. In other words, the oldest data set in the queue is selected. This may also be done from a date of creation property;

the data set for which the priority level property is the highest is selected;

a data set is selected as a function of a plurality of properties, for example by calculating a score with a formula of the type:

$$score=age(message)*priority$$

the message, that is to say the data set, having the best score is selected; . . . the list is not exhaustive.

In the description the notion of best score is used. This notion is an implementation choice. This best score is, according to the implementation of the invention:

The highest score, or

The lowest score.

With the formula given as example, the best score would be the highest score.

From the selection step the terminal passes to a step 1020 of producing a message, that is to say formatting the selected data set for its transmission to the relay device.

From the step 1020 of producing a message the terminal passes to a step 1030 of sending the message produced to the relay device.

From the step 1030 the selected data set is considered as sent. In addition, the terminal can guarantee to its user the transmission to the relay device which is equivalent to forwarding to the recipient.

In an alternative of the invention an invitation message comprises a field for recording a capacity. FIG. 2 shows a second invitation message MI2.2 comprising:

a code field MI1.1 identical to the code of the first invitation message;

a capacity field MI2.2 comprising a capacity expressing the maximum for the size of the data set that the terminal should select.

In this alternative the terminal may thus use this capacity value as criterion for selecting a message.

For example, if this capacity value is equal to four this signifies that if the terminal selects a data set of which the size is at the most 4, then this data set will be forwarded straight away.

Such a case arises, for example, when in response to an invitation message the terminal has sent 20 octets of data. The relay device thus has in this case transmitted 12 octets immediately and, at the following time window, it still had 8 octets to place. There was thus still space for 4 octets, which it signals to the terminal through the capacity field.

In practice, an invitation message is sent sufficiently in advance of the start of the time window having to be used for the forwarding of data. This sufficient advance allows the terminal to produce a message and allows the relay device to receive the message produced. This is possible, among others, because the link between the terminal and the relay device has a data transfer rate much higher than the forwarding data transfer rate which is conventionally 12 octets per second.

The invention claimed is:

1. A method for transmitting data by a terminal connected to a data relay device, the data transmitted by the terminal being forwarded by the data relay device, the data relay device being configured to forward said data within one or more of a plurality of separate time windows, the method comprising the following steps, implemented by the terminal:

receiving, from the data relay device, an invitation message to transmit data, said message being received in advance of a start of said one of more of a plurality of separate time windows;

in response to said invitation message, selecting, by said terminal, a set of data to transmit;

producing a data message to be transmitted, comprising the selected set of data;

sending the data message to the data relay device in response to the invitation message, wherein said invitation message originates from the data relay device and is sent by the data relay device to the terminal only when the relay device has passband available which guarantees immediate forwarding of the data message by the data relay device.

2. The method for transmitting data according to claim 1, wherein the invitation message comprises a capacity information expressing a quantity of data that can be transmitted during a time interval predetermined from a time of receiving the invitation message.

3. The method for transmitting data according to claim 2, wherein a size of the data contained in the data message is greater than the capacity information.

4. The method for transmitting data according to claim 1, wherein a time interval between a first invitation message and a following second invitation message depends on the quantity of the selected set of data.

5. The method for transmitting data according to claim 1, wherein the selection of data is done from among a set of data sets, the step of selecting data comprising the following steps:

allocating a score to each data set;

selecting the data set having the best score.

6. The method for transmitting data according to claim 1, wherein the data message sent by the terminal to the data relay device is forwarded by the data relay device within a first time window of said plurality of separate time windows, and wherein the method further comprises the following additional steps, implemented by the terminal:

after the data message has been forwarded by the data relay device within said first time window, receiving, from the data relay device, a second invitation message to transmit data, said second invitation message being received in advance of a start of a second time window of said plurality of separate time windows;

selecting a second set of data to transmit;

producing a second data message to be transmitted, comprising the selected second set of data;

sending the second data message to the data relay node in response to the second invitation message, said second data message being forwarded by said data relay device during said second time window.

7. The method for transmitting data according to claim 1, wherein the data relay device transmits said invitation message according to a time criterion and a quantity of data remaining to be transmitted on behalf of the terminal.

8. A non-transitory recording support readable by a computer on which is recorded a computer program including program code instructions for the execution of the method according to claim 1.

9. A device comprising the non-transitory recording support according to claim 8.

* * * * *